(12) United States Patent
Godfroid

(10) Patent No.: US 10,123,648 B2
(45) Date of Patent: Nov. 13, 2018

(54) SYSTEM AND METHOD FOR COOKING

(71) Applicant: Robert Godfroid, McKinney, TX (US)

(72) Inventor: Robert Godfroid, McKinney, TX (US)

( * ) Notice: Subject to any disclaimer, the term of this patent is extended or adjusted under 35 U.S.C. 154(b) by 57 days.

(21) Appl. No.: 14/957,670

(22) Filed: Dec. 3, 2015

(65) Prior Publication Data

US 2017/0156537 A1 Jun. 8, 2017

(51) Int. Cl.
| | | |
|---|---|---|
| *A47J 27/10* | (2006.01) |
| *B65D 33/00* | (2006.01) |
| *B65D 33/01* | (2006.01) |
| *B65D 33/25* | (2006.01) |
| *B65D 81/20* | (2006.01) |
| *B65D 81/34* | (2006.01) |
| *A23L 5/00* | (2016.01) |

(52) U.S. Cl.
CPC ............... *A47J 27/10* (2013.01); *A23L 5/00* (2016.08); *B65D 33/008* (2013.01); *B65D 33/01* (2013.01); *B65D 33/2508* (2013.01); *B65D 81/2038* (2013.01); *B65D 81/3415* (2013.01)

(58) Field of Classification Search
CPC .......... A47J 36/32; A47J 27/10; A47J 27/004; A47J 36/16; A47J 36/2483; A47J 27/18; B65B 25/22; B65B 7/06; B65B 31/02; B65B 31/047; B65B 29/08; B65B 31/04; B65D 33/25; B65D 33/2508; B65D 33/008; B65D 33/01
USPC .................. 99/325, 331, 332, 342, 447, 352
See application file for complete search history.

(56) References Cited

U.S. PATENT DOCUMENTS

| | | | | |
|---|---|---|---|---|
| 3,819,089 A * | 6/1974 | Scales | ................ | B65D 81/3415 222/181.1 |
| 4,340,610 A * | 7/1982 | Nioras | ..................... | G01K 1/14 374/150 |
| 4,595,487 A * | 6/1986 | Nunlist | ..................... | G01K 1/14 204/288.3 |
| 4,808,381 A * | 2/1989 | McGregor | ............ | A61J 1/1406 215/307 |
| 4,852,916 A * | 8/1989 | Johnson | ................... | F16L 41/14 285/187 |
| 5,097,759 A * | 3/1992 | Vilgrain | ................... | A47J 17/18 219/441 |
| 5,199,297 A * | 4/1993 | Lin | ........................... | G01K 1/14 374/143 |
| 5,280,748 A * | 1/1994 | Pardo | ....................... | A23L 3/10 99/330 |
| 5,287,680 A * | 2/1994 | Lau | ......................... | B65B 31/06 53/133.4 |
| 5,407,641 A * | 4/1995 | Katschnig | ................ | A61L 2/12 219/679 |
| 5,765,608 A * | 6/1998 | Kristen | ................. | B65B 31/047 141/198 |
| 5,873,217 A * | 2/1999 | Smith | ..................... | B65B 31/06 53/133.4 |

(Continued)

*Primary Examiner* — Eric Stapleton
(74) *Attorney, Agent, or Firm* — Braxton Perrone, PLLC

(57) ABSTRACT

A system and method for cooking. The system includes a sealable bag and a bag seal located on the sealable bag. Coupled to the sealable bag is a snorkel which has a top end and a bottom end. The snorkel also has a cap. The snorkel is coupled to the sealable bag such that when the sealable bag is immersed in a fluid, the hydrostatic pressure of the fluid causes the air to be purged from the sealable bag. The resulting purged bag is then cooked in the bath of fluid for a desired time and temperature. The removal of air provides several benefits including more uniform cooking.

18 Claims, 3 Drawing Sheets

(56) References Cited

U.S. PATENT DOCUMENTS

| | | | | | |
|---|---|---|---|---|---|
| 6,056,985 | A * | 5/2000 | Fluckiger | B65D 75/52 374/137 |
| 6,550,259 | B2 | 4/2003 | Cartwright | F25D 29/00 62/126 |
| 7,021,034 | B2 * | 4/2006 | Higer | B65B 31/00 53/510 |
| 7,096,893 | B2 * | 8/2006 | Vilalta | B65B 31/047 141/65 |
| 7,127,875 | B2 * | 10/2006 | Cheung | B65B 31/047 53/510 |
| 7,284,361 | B2 * | 10/2007 | Lau | F04D 25/084 141/65 |
| 7,316,101 | B1 * | 1/2008 | Nguyen | B65B 31/06 53/408 |
| 7,503,158 | B2 * | 3/2009 | Bassett | B65B 31/04 206/524.8 |
| 7,757,601 | B2 * | 7/2010 | Lagares Corominas | A23L 5/13 165/61 |
| 7,805,913 | B2 * | 10/2010 | Alipour | B29C 65/18 53/434 |
| 8,096,329 | B2 * | 1/2012 | Thuot | B65B 31/04 141/127 |
| 8,153,001 | B2 * | 4/2012 | Peters | B01D 29/27 210/232 |
| 8,191,469 | B2 * | 6/2012 | Bergman | B65B 31/047 206/524.8 |
| 8,240,112 | B2 * | 8/2012 | Binger | F04B 9/047 417/415 |
| 8,833,245 | B2 * | 9/2014 | Alipour | F24J 3/00 99/483 |
| 9,282,846 | B2 * | 3/2016 | Alipour | A47J 27/004 |
| 9,398,640 | B2 * | 7/2016 | Bhaidasna | H05B 1/0269 |
| 9,603,477 | B2 * | 3/2017 | Hoare | A47J 27/10 |
| 9,615,689 | B2 * | 4/2017 | Plazarte | A47J 27/10 |
| 2010/0159083 | A1 * | 6/2010 | Peplinski | B65D 81/3266 426/113 |
| 2011/0236540 | A1 * | 9/2011 | Owensby | B32B 27/34 426/106 |
| 2012/0137898 | A1 * | 6/2012 | Alipour | F24J 3/00 99/483 |
| 2012/0213896 | A1 * | 8/2012 | Owensby | B32B 27/08 426/113 |
| 2012/0251695 | A1 * | 10/2012 | Neff | A47J 27/004 426/509 |
| 2013/0240500 | A1 * | 9/2013 | Alipour | A47J 27/004 219/438 |
| 2013/0251867 | A1 * | 9/2013 | Carre | B65D 77/003 426/393 |
| 2013/0284031 | A1 * | 10/2013 | Braukmann | A47J 36/2483 99/343 |
| 2014/0251164 | A1 * | 9/2014 | Alipour | A47J 27/10 99/483 |
| 2014/0260998 | A1 * | 9/2014 | Pearson | A47J 27/002 99/288 |
| 2015/0272371 | A1 * | 10/2015 | Gagnon | A47J 27/10 426/231 |
| 2015/0335192 | A1 * | 11/2015 | Plazarte | B65B 25/22 99/332 |

* cited by examiner

SYSTEM AND METHOD FOR COOKING

BACKGROUND OF THE INVENTION

Technical Field

The present invention relates to a system and method for cooking.

Description of Related Art

Sous vide cooking is a technique where food, often protein, is sealed under vacuum in a plastic bag and immersed in a circulating water bath with precise temperature control. While this method is used in restaurants and commercial settings over the past decade, its usage in consumer homes has been limited because of the inability to provide an inexpensive sealable bag. Consequently, it is desirable to have an affordable and simple system and method utilizing sous vide cooking in residential homes.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
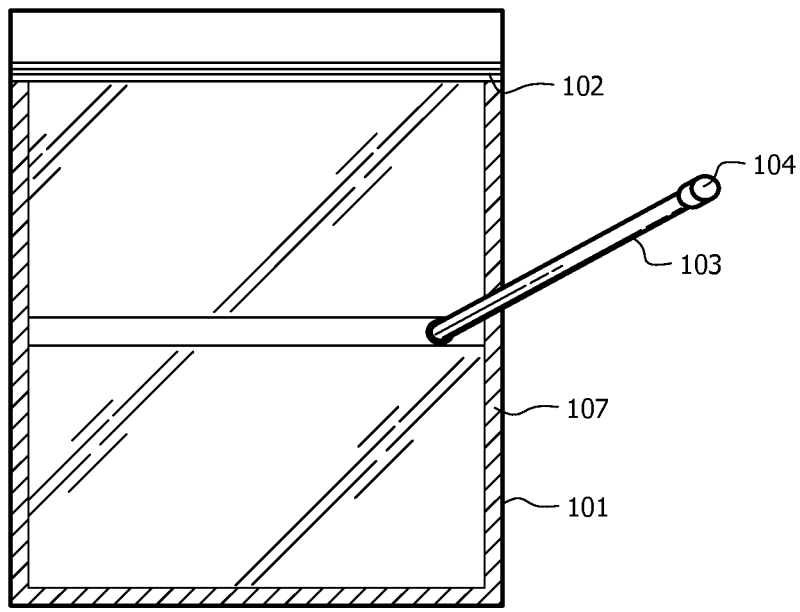
FIG. 1 is a top view of a sealing bag in one embodiment.

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

As noted, sous vide cooking is a technique where food, often protein, is sealed under vacuum in a plastic bag and immersed in a circulating water bath with precise temperature control. Used extensively in restaurants and commercial settings over the past decade, it is desirable to have a system and method wherein this technique can be used in consumer homes. Sous vide, which means "under vacuum" in French, cooks at the lowest temperature possible and yields meat that is cooked to exact "doneness" from edge to edge every time. Typical high-temperature grilling creates a temperature gradient in the meat from the surface to the core and requires a skilled hand to deliver perfect doneness inside while not overcooking the outside. The technique is not limited to meat protein, it is also very effective for other temperature-sensitive preparations of eggs, custards, creams, etc. Recent breakthroughs in electronics have significantly lowered the price of sous vide circulators, which are now affordable in the consumer market in the ~$200 price range.

In one embodiment, the method of cooking disclosed herein requires food to be sealed in a plastic bag to prevent the water bath from poaching or waterlogging the food as it cooks. Other ingredients like marinades and seasoning can also be added to the bag for flavoring the food as it cooks.

The packaging, in one embodiment, must remain waterproof across a temperature range of −20° C. to 100° C. (freezer to boiling water) and be capable of conforming closely to the food to allow the bag to remain submerged for maximum heat transfer from the water bath. Bags that trap an insulating layer of air around the food are not desirable, in one embodiment, as this inhibits heat transfer. Air in the bag also causes the bag to float on the top of the bath leading to poor cooking or even pathogen growth. In a commercial situation, a chamber vacuum sealer is utilized to remove air from the bag and seal against moisture entry. These are heavy, large and expensive but can seal liquid and solid food preparations reliably. For the home cook, chamber vacuum sealers represent a significant barrier to entry to sous vide cooking by costing greater than $500, weighing ~50 lbs and requiring 1.5'×2' of counter top space. Further, the size of the product to be cooked is limited by the size of the vacuum system. Another downside of vacuum sealers is that many of these sealers do not work properly if an amount of fluid is also to be sealed. Instead, many of these sealers only function with solid products with very little fluid. This prevents the inclusion of marinades during cooking, for example. Accordingly, these systems are often too large, cumbersome, and expensive to be practical for widespread home use. Consequently, the vacuum sealing system fails to adequately solve the problem. Accordingly, a sealable bag has been developed which allows the bag to be sealed, purged of air, placed under vacuum if desired, and cooked in a water bath without the use of a mechanical vacuum sealer.

FIG. 1 is a top view of a sealing bag in one embodiment. As shown the sealable bag 101 has a bag seal 102. The sealable bag 101 is coupled to a snorkel 103, discussed in more detail below.

The sealable bag 101 can comprise any bag which can be sealed. In one embodiment the sealable bag 101 comprises a plastic bag which can be flat, gusseted, or formed into a shape that optimizes its internal dimensions. The sealable bag 101 can comprise virtually any water-proof material and can include but is not limited to plastic, polyolefin, nylon, PET, PLA, PBS, PVDC, biopolymers, silicone polymers, coated fabrics, fiber-based materials, and mixtures thereof. One skilled in the art will understand the various materials which can be utilized to provide the desired barrier, strength, and pliability in the temperature range of −20 to 100° C. In one embodiment the material allows for reusability of the sealable bag 101 whereas in other embodiments the sealable bag 101 is designed for a single use. As noted, in one embodiment the sealable bag 101 can be submerged in water, using the hydrostatic pressure to purge the air, and not allow water to gain entry into the sealed bag 101.

As noted, the sealable bag 101, in one embodiment, further comprises a bag seal 102. The bag seal 102 can comprise any seal known in the art which prevents water from the water bath from entering the sealable bag 101 once sealed. In one embodiment the sealable bag 102 comprises a reusable seal. A reusable seal, as used herein, refers to a seal which can be sealed, unsealed, and sealed again. A zipper seal, for example, is a reusable seal. The reusable seal can comprise zippers, snaps, be rolled and clipped, etc., or virtually any reusable seal known in the art.

In another embodiment the sealable bag 101 comprises a single use seal. A single use seal, as used herein, refers to a seal which can only be sealed a single time. A heat sealable seal is an example of a single use seal. In such an embodiment, for example, the uncooked product is placed within the sealable bag 101, and thereafter heat is applied to the seal 102 to create the seal. In one such embodiment, sufficient heat is supplied to partially melt the product in the seal 102 so as to create a seal once cooled.

While the seal 102 is depicted as being located on the top end of the sealable bag 101, this is for illustrative purposes only and should not be deemed limiting. The seal 102 can be located at virtually any place on the sealable bag 101.

Typical zipper seal bags are not secure for submersion. In a typical zipper seal bag, such as those commonly used for sandwiches, the seals and corners are too weak to provide for extended submersion without failure. Consequently, in one embodiment, and as depicted, the sealable bag 101 comprises edge seals 107. An edge seal, as used herein, refers to two or more layers which have been heat sealed to form a seal in the desired location. In one embodiment, an edge seal comprises a flange seal. In another embodiment butt seals are used to join edges. In yet another embodiment edges are sealed using lap seals. In yet another embodiment the body of a sealable bag is formed from a seamless tubular sleeve which is then sealed transversely using the aforementioned methods. As depicted, the sealable bag 101 comprises edge seals 107 along the entire closed perimeter of the sealable bag 101. A closed perimeter is a side of bag 101 which cannot be opened. As depicted, the bottom side, left side, and right side all comprise a closed side because they are permanently closed. Conversely, the top side is an open side because it is open to insert product. Accordingly, in one embodiment the sealable bag 101 comprises an edge seal 107 along its bottom side, along its left side, and along its right side. An edge seal 107 offers superior strength compared to traditional sandwich bags. The edge seal 107 offers a seal which will not fail during submersion. The size and thickness of the edge seal 107 can vary depending upon the size of the bag 101. However, in one embodiment the edge seal 107 has a width of between about $\frac{1}{10}^{th}$ of an inch to about ½ of an inch.

Another reason traditional zipper seal bags, such as sandwich bags, often fail is the zipper or its attachment to the finished bag is often insufficient to make a seal which can withstand extended submersion without failure. Typical zipper seal bags comprise two male elements which friction-fit with female recesses to provide a seal. A male element is an element which extends outward relative to the planar surface. While that may be sufficient in some embodiments, other embodiments may require a more robust zipper. In one embodiment the robust zipper comprises a zipper which has comparatively larger elements. In another embodiment, both the top layer and the bottom layer for the zipper comprise a male and female component. In the traditional zipper seal bag, the top layer will comprise female recesses and the bottom layer will comprise the corresponding male elements. Conversely, in one embodiment of a robust zipper, the top zipper layer and the bottom zipper layer each comprise at least one male component and at least one female component. This provides a superior seal which can withstand elongated periods of submersion. Those skilled in the art will be able to determine which zippers, including currently existing zippers, possess the required sealing strength, durability, and construction for the intended purpose.

As noted, in one embodiment the sealable bag 101 prevents water or other cooking fluid from entering the sealed sealable bag 101 when it is submerged. In another embodiment the sealed sealable bag 101 prevents water or other cooking fluid from entering the sealable bag 101 when the sealable bag 101 is under a vacuum. Just as one embodiment has been described where water or other cooking fluid is prevented from entering the sealable bag 101, in one embodiment fluid is likewise prevented from leaving the sealable bag 101 when it is submerged and/or under a vacuum. Such an ability prevents juices, seasonings, marinades, etc. from leaving the food product as it cooks.

Fluidly coupled to the sealable bag 101 is the snorkel 103. A snorkel, as used herein, refers to an object which is fluidly connected to the sealable bag 101 such that air can be forced from the sealable bag 101 to the snorkel 103. The snorkel has two ends: a bottom end which is fluidly coupled to the sealable bag and a top end. As used herein, "fluidly coupled" refers to two objects which are coupled such that air or other fluids may pass between the two coupled objects. In one embodiment fluidly coupled refers to two objects which are directly coupled to one another, whereas in other embodiments fluidly coupled refers to two objects which are indirectly coupled, such as, via a third object.

As depicted, the top end of the snorkel is coupled to the snorkel cap 104. The snorkel cap 104 closes and seals the snorkel 103, and accordingly, the sealable bag 101. The snorkel cap 104 can comprise any device which closes and seals the snorkel 103. The snorkel cap 104 can comprise a valve, a cap, a plug, an object which squeezes and pinches the snorkel 103 shut, etc. either mechanically or through a heat sealing. In one embodiment, discussed in more detail herein below, the snorkel cap 104 comprises a one-way valve which allows air to exit in one direction but does not allow air to flow in the opposite direction. Virtually any device or method which can close and seal the snorkel 103 can be used as the snorkel cap 104.

In one embodiment the snorkel 103 further comprises a holder which allows the snorkel 103 to be affixed and held in an orientation whereby the top of the snorkel 103 remains above the cooking fluid. This helps prevent the top of the snorkel 103 from tipping into the cooking fluid and possibly resulting in cooking fluid entering the snorkel cap 104. The holder can comprise a clip, support ring, etc. to position the snorkel 103 in a desired upright position. In other embodiments a holder is unnecessary as the snorkel 103 comprises a rigid material which will maintain the desired orientation without external support. In still other embodiments it is of no concern whether the top of the snorkel 103 remains above the cooking fluid during cooking as the snorkel cap 104 prevents unwanted cooking fluid from entering the snorkel 103. In one embodiment, as discussed in more detail below, the top of the snorkel 103 is held above the cooking fluid line to remove air from the sealable bag 101 but once the air has been removed, the location of the top of the snorkel 103 relative to the cooking fluid line during cooking is inconsequential.

As depicted, the bottom end of the snorkel 103 is fluidly coupled to the sealable bag 101. The bottom end of the snorkel 103 can be coupled via any method or device known in the art. As an example, in one embodiment the sealable bag 101 comprises a barb or port (not shown) which couples to the bottom of the snorkel 103. In one embodiment the barb or port is located at the corner of the bag to allow for maximum air removal. In some embodiments the snorkel 103 is reusable and can affix to said port via a barbed friction coupling. For example, in embodiments wherein the snorkel 103 couples to a barb, fitment, or equivalent, the snorkel 103 can simply be decoupled after cooking and then reused on other sealable bags 101.

In another embodiment the snorkel 103 punctures or pierces the sealable bag 101 and the sealable bag 101 forms around the snorkel 103 so as to provide a seal. In one embodiment the sealable bag 101 is sufficiently robust, tight, and/or strong such that when punctured by the snorkel 103 a sufficient seal forms between the sealable bag 101 and the snorkel 103. In one embodiment the sealable bag 101 comprises an additional piece such as a button which is adhered to the sealable bag 101. The button, as an example, can comprise a port to which the snorkel 103 attaches. Virtually any method known in the art which couples the sealable bag 101 to the snorkel 103 such that a seal is created which prevents the entry of fluids when submerged can be utilized. In one embodiment a port or other mechanical device is used to create the seal between the snorkel 103 and the sealable bag 101. In other embodiments the sealable bag 101 comprises a meltable portion 105 whereby the snorkel 103 can be heat welded to the sealable bag 101 like a common intravenous fluid bag. In one embodiment the snorkel 103 and the sealable bag 101 are integrally made as a single piece. In one such embodiment the snorkel 103 can comprise a port located on the face of the sealable bag 101, on a side edge of the sealable bag 101, on a top or bottom edge of the sealable bag 101, or on a corner. In still other embodiments the snorkel 103 and the sealable bag 101 are separate pieces which are coupled together. As noted, in one embodiment the snorkel 103 is successfully coupled to the sealable bag 101 such that fluid cannot enter or escape from the inside compartment of the sealable bag 101 when sealed.

The snorkel 103 can comprise any material, including food grade materials, which can transfer fluid, such as air, under a variety of pressures including positive and negative pressures. In one embodiment the snorkel 103 can pull a vacuum on the sealable bag 101. In one embodiment the snorkel 103 comprises a tube comprising the same material as the sealable bag 101. The snorkel 103 can be manufactured via any method known in the art including injection molding, extrusion, film converting process, etc. In one embodiment the snorkel 103 comprises a diameter greater than 4 mm. This diameter allows air to escape more quickly compared to smaller diameters. In some embodiments the snorkel 103 comprises a diameter greater than 6 mm to allow good air flow out of the sealable bag 101.

The length and shape of the snorkel 103 can vary. The length will depend in part on the size of the sealable bag 101. In one embodiment the length is between 10 and 300 mm in length. Virtually any length that allows the snorkel 103 to be fluidly connected to the sealable bag 101 on one end and have the top end be above the water line during the air removal phase can be utilized. The snorkel shape can vary depending upon the size and number of sealable bags 101, the size of the cooking bath, etc. In some embodiments the snorkel 103 is straight while in other embodiments the snorkel 103 comprises a curved, bent, or other non-linear shape.

As depicted the snorkel 103 is coupled to the middle of the sealable bag 101. This is for illustrative purposes and should not be deemed limiting. In other embodiments the snorkel 103 can be coupled on the face of the sealable bag 101, on a side edge of the sealable bag 101, on a top or bottom edge of the sealable bag 101, or to a corner. In some embodiments, being positioned in the corner or along an edge advantageously places the snorkel 103 at a place where air naturally concentrates while under hydrostatic pressure, increasing the efficiency of air removal.

Figure 2:
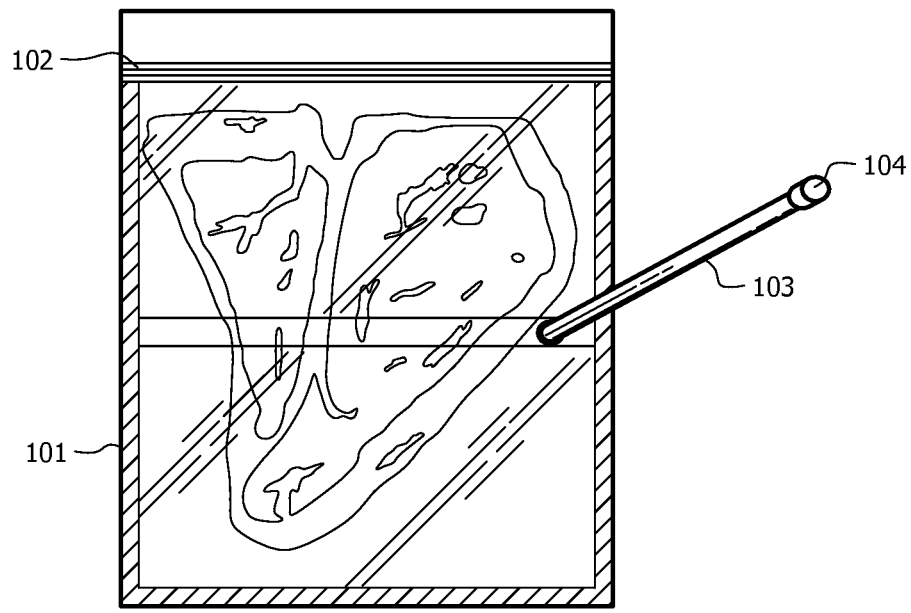
FIG. 2 is a top view of a sealing bag in another embodiment loaded with protein.

Turning now to FIG. 2, FIG. 2 is a top view of a sealing bag in another embodiment loaded with an uncooked product. In operation, an uncooked product is first placed into the sealable bag 101. Thereafter, the sealable bag 101 is sealed as previously discussed. Once the sealable bag 101 is sealed, it is at least partially submerged into a cooking bath. When placed in the cooking bath, the hydrostatic pressure of the cooking fluid, such as water, in the bath exerts pressure uniformly on all points at the bag surface depending upon the depth. Because air is the most buoyant ingredient in the bag, as the sealable bag 101 becomes more submerged, the hydrostatic pressure forces the air upward as it attempts to escape the comparatively higher pressure of the hydrostatic pressure. Because of the snorkel 103, air is allowed to escape upward through the snorkel 103, which is not submerged in the water. Without the snorkel, air would be trapped in the sealable bag 101. However, the snorkel 103 provides a path for the air to evacuate the sealable bag 101 even when it is completely submerged. Accordingly, the use of the snorkel 103 provides an advantage of allowing air to be removed due to hydrostatic pressure even when the sealable bag 101 is completely submerged. This would be impossible without a snorkel 103 which extends beyond the cooking fluid. In one embodiment the snorkel 103 is connected to the top of the "balloon" formed by the sealed bag 101 when it is submerged. This efficiently allows the air to exit the sealable bag through the snorkel 103.

As noted previously, in one embodiment it is desirable to remove as much air as possible from the sealed bag 101. An insulating layer of air in the bag 101 inhibits heat transfer, resulting in uneven cooking which is undesirable. Further, trapped air in the bag 101 causes the bag to float on top of the bath leading to poor cooking and possibly pathogen growth. Consequently, in one embodiment, it is desirable to remove the air from the sealed bag 101. The snorkel 103, described above, provides the ability to remove air. Without the snorkel, a user could force an unsealed bag 101 under water to remove as much air as possible without allowing water to enter the bag 101 and then seal the bag as quickly as possible. However, this method does not allow removal of a satisfactory volume of air; some air remains trapped within the bag 101. A snorkel 103, however, allows the entirety of the sealed bag 101 to be submerged while excess air is removed from the snorkel 103. Accordingly, a snorkel allows a smaller hole to purge air and a useful way to commute air from the bag 101 to the atmosphere above the cooking fluid.

As noted, in one embodiment, hydrostatic pressure is used to purge the sealable bag 101 of air. As those skilled in the art will understand, in a column of water the pressure increases with the depth as a result of the weight of the overlying fluid. This pressure difference is the driving force which causes the air to be purged when the sealed bag 101 is submerged; the air travels from the high pressure to the comparatively lower pressure. However, this pressure difference may not always be achieved if the object does not sink in the fluid. Objects having a density greater than the fluid will sink, however, objects having a density less than the fluid will float. As an example, carrots loaded in a sealable bag 101, in some embodiments will float even when the air has been purged. Accordingly, in some embodiments the sealable bag 101 is coupled to an anchor (not depicted) via an anchor coupling device. The anchor can be coupled via any method or device known in the art. In one embodiment the anchor coupling device comprises holes located in the edge seal, for example. The anchor causes the carrots, as an example, to be pulled downward due to the weight of the anchor. This allows for the purging of the air, as well as ensuring the carrots are completely submerged to allow for effective cooking. In another embodiment the anchor coupling device comprises a clamp which clamps to the sealable bag and couples an anchor. The anchor coupling device can comprise any device which couples the sealable bag to an anchor which can pull the sealable bag downward into the cooking fluid.

In one embodiment a vacuum can be pulled on the snorkel 103 to remove even more air. In one embodiment the vacuum works with the hydrostatic pressure to remove air from the sealable bag 101. The vacuum can be applied to the sealable bag 101 via any method or device known in the art. In one embodiment, with the cap 104 removed or loosened, the user can draw a vacuum through the snorkel 103 with their mouths. In other embodiments a vacuum pump, syringe, or other device known in the art can be coupled to the snorkel 103 to create a vacuum. In one embodiment (not shown), the snorkel 103 comprises a valve or barb which allows a vacuum to be drawn. Virtually any vacuum can be achieved but in one embodiment the vacuum ranges from about 2 mm Hg to about 750 mm Hg. Once a vacuum has been drawn, the cap 104 can be tightened, secured, etc. to maintain the vacuum. A vacuum, in one embodiment, results in more air being withdrawn from the sealable bag 101 and consequently results in better cooking and cooking conditions.

The snorkel 103 offers several benefits which were not possible in a completely sealed bag which did not have a snorkel 103. One benefit is the ability to release gasses during cooking. When some products cook, they release gas. By allowing the cap 104 to remain open, or by opening it temporarily, these off gases can be vented during cooking, reducing the possibility for a buildup of gas which can hinder cooking. In one such embodiment the cap 104 comprises a one-way valve, or other such device, which allows for passage of a fluid in a first direction but not a second direction. Such a valve, in one embodiment, allows for automatic venting during cooking but not allow other air to be pulled into the sealable bag 101. An additional benefit is the ability to add flavor, spices, marinade, and other ingredients to the sealable bag 101 during cooking. As an example, in one embodiment marinade can be added via the snorkel 103 during cooking. Neither of these benefits are possible with the prior art vacuum sealed bag.

Figure 3:
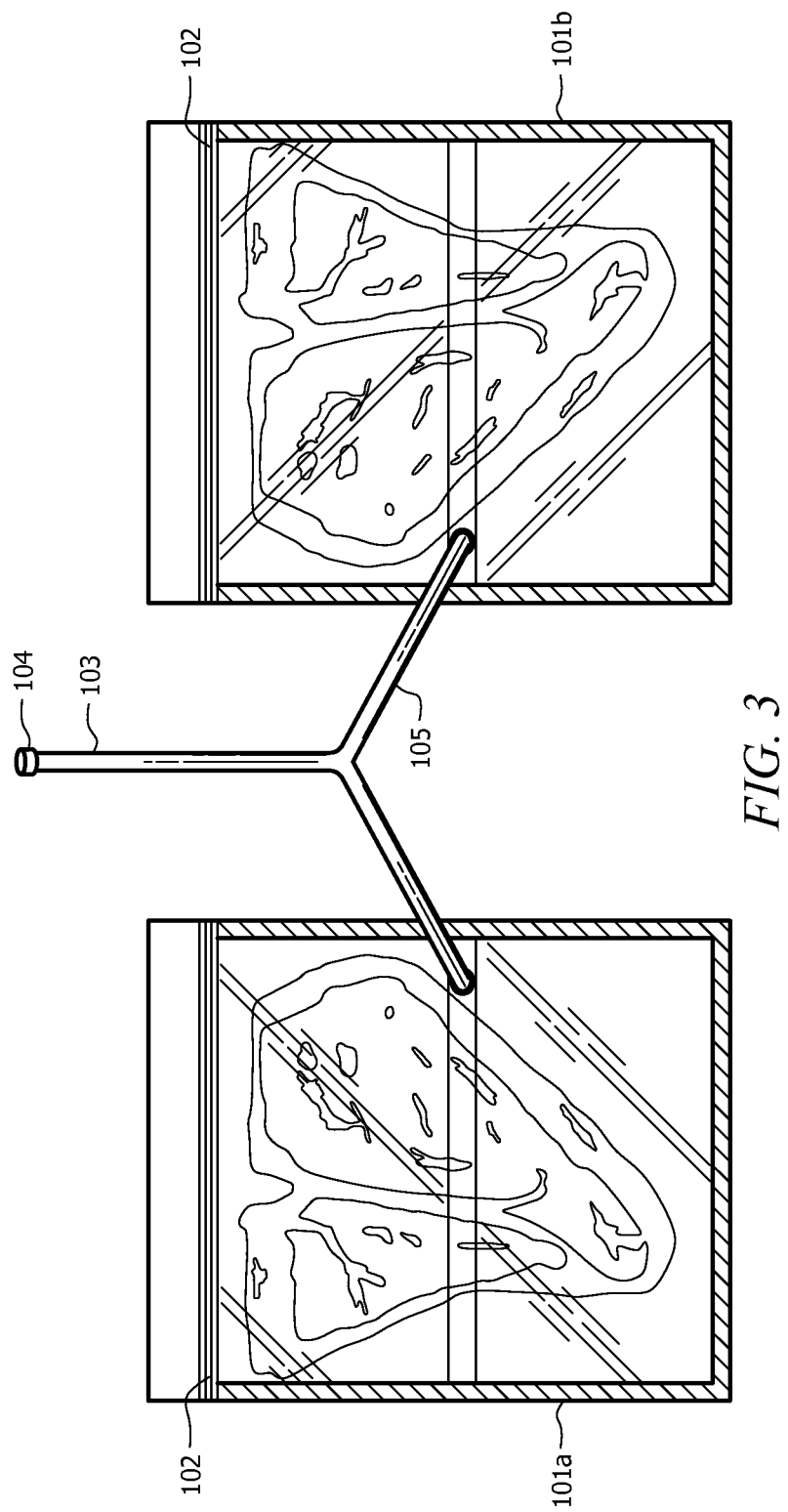
FIG. 3 is a top view of two sealing bags in parallel in one embodiment.

FIG. 3 is a top view with two sealable bags connected in parallel. In one embodiment, as depicted in FIG. 3, two or more sealable bags 101 are connected in parallel to a single snorkel 103. This allows two or more sealable bags 101 to share a single snorkel 103. This results in more efficient preparation time as air from two or more sealable bags 101 is withdrawn simultaneously. Further, if a vacuum is pulled then a vacuum can be drawn on two or more sealable bags 101 simultaneously using a single snorkel 103. As can be seen, this arrangement can result in decreased equipment costs as the user will not require a separate snorkel 103 for every bag.

As depicted, the two sealable bags are in fluid communication to the snorkel 103 via a snorkel connector 105. As shown, two snorkel connectors 105 split from the snorkel 103 and couple to the sealable bag 101. A snorkel connector 105 is any device which fluidly connects two or more sealable bags 101 to a snorkel 103 such that air can pass from the sealable bags to the snorkel 103. The snorkel connector 105 can comprise tubing, piping, etc. While two sealable bags 101 have been shown, this is for illustrative purposes only and should not be deemed limiting. In other embodiments three or more sealable bags 101 can be connected to a fewer number of snorkels 103. For example, in one embodiment four sealable bags 101 are connected to a single snorkel 103. In other embodiments, four sealable bags 101 are connected to two snorkels 103.

Figure 4:
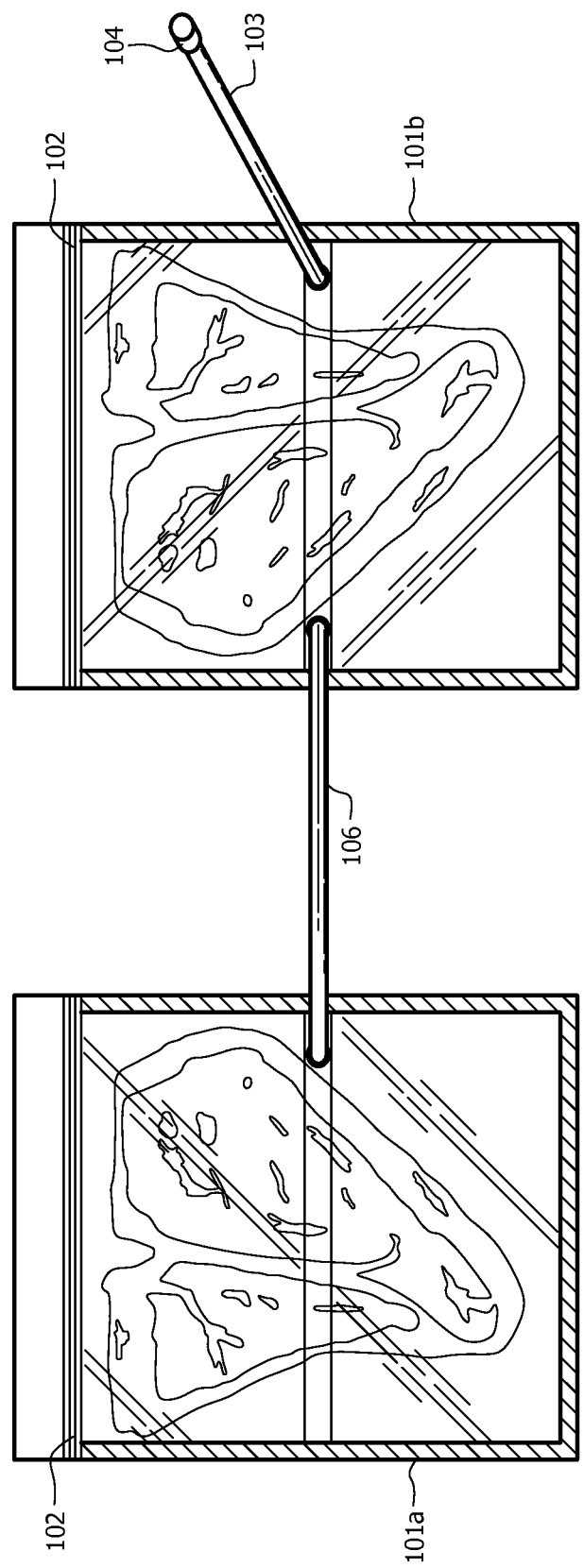
FIG. 4 is a top view of two sealing bags in series in one embodiment.

In still other embodiments, two or more sealable bags are connected in series to a single snorkel 103. FIG. 4 is a top view of two sealable bags connected in series. In such an embodiment, a first sealable bag 101*a* will be connected to a second bag 101*b* via a bag connector 106. A bag connector 106 is any device which fluidly connects two or more sealable bags such that air can pass between the bags. The bag connector 106 can comprise tubing, piping, etc. As shown, when a vacuum, for example, is pulled on the snorkel 103, air is withdrawn from the first bag 101*a* via the bag connector 106. The embodiments utilizing two or more bags 101 in series offer many of the same advantages as the parallel arrangement discussed above. In one embodiment, the first sealable bag 101*a* must be positioned lower in the hydrostatic or cooking fluid than the second sealable bag 101*b*. Such an arrangement allows air to be purged from the first sealable bag 101*a* through the second sealable bag 101*b*. If the first sealable bag 101*a* were positioned vertically above the second sealable bag 101*b*, air will not purge under the force of hydrostatic pressure from the first bag 101*a* to the second bag 101*b*.

While a system for packaging a product has been described, a method of cooking the product will now be described. First, a food product is placed into a sealable bag. As discussed, the sealable bag is in fluid communication to a bottom end of a snorkel. The food product can comprise virtually any food product which is to be cooked. This includes, but is not limited to, protein such as poultry, beef, pork, fish, seafood, etc., vegetables, pasta, fruit, eggs, custards, creams, and other foods. In some embodiments drinks, including alcoholic drinks, can be prepared with the method discussed herein. Virtually any food, solid and liquid, which can be cooked via conventional methods can be cooked with sous vide cooking.

After placing the food product into the sealable bag, the sealable bag is then sealed. As discussed, the sealing step can comprise any device or method known in the art to seal a bag.

Thereafter, the sealable bag is placed into a cooking bath. A cooking bath, as used herein, refers to any object which can hold a volume of cooking fluid at a specified cooking temperature. The cooking fluid can comprise any cooking liquid such as oil, water, etc. In one embodiment, the cooking fluid comprises water. In one embodiment the cooking bath comprises a heating element to ensure that the cooking bath is maintained at the cooking temperature. In another embodiment the cooking bath has a circulator whereby the cooking fluid is circulated to ensure a desired temperature uniformity within the cooking bath.

Sometime prior to cooking, the air within the sealable bag is removed. In one embodiment, this is accomplished while the cap 104 on the snorkel 103 is open to allow for the passage of air. In one embodiment the cap 104 is open while the sealable bag has been at least partially submerged into the cooking bath. As noted, the hydrostatic pressure of the cooking fluid acts upon the air in the partially submerged bag to force the air upwards and into the snorkel 103 and through the open cap 104. If desired, a vacuum can be pulled on the snorkel 103 as previously described. Thereafter, once the air has been removed, the cap 104 is closed. Thereafter, the food product is cooked in the cooking bath at a specified cooking temperature for a desired cooking time.

As noted, the cooking bath maintains the cooking fluid within a specified cooking temperature. The cooking temperature will vary depending upon the food product to be cooked. In one embodiment the cooking temperature is less than 100° C. As an example, for a steak to be cooked to medium rare, in one embodiment, the cooking temperature is set around 58° C. Conversely, dark meat chicken is cooked at a cooking temperature of about 75° C. Sticking with the chicken example, in such an embodiment the cooking fluid is held at a temperature of about 75° C. This means the desired final temperature of the chicken is 75° C. Accordingly, the chicken is never exposed to a temperature greater than the desired final cooking temperature of the food. If cooked at the cooking temperature for the required cooking time, then the entire food, including the center of the food, will have reached the desired internal temperature. This is contrasted with conventional cooking whereby the external surfaces of the food are exposed to temperatures far exceeding the desired final internal temperature. This is why conventional cooking results in a final product which has a gradient: the external surface will be well done, then it gradually changes to less done, medium, and then ending with a medium rare center. Conversely, cooking with the method discussed herein results in uniform cooking. If the cook desires medium rare, then the entire cross-section of a steak, for example, will comprise a medium rare color and texture.

As noted, the food product is maintained in the cooking bath at the cooking temperature for a cooking time. The cooking time is the time necessary to ensure the food product reaches the desired internal temperature. As with the cooking temperature, the required cooking time varies with the food product and the cooking temperature. For example, the chicken discussed above requires a cooking time of between about 1 hour and 3 hours. The cooking time, combined with the cooking temperature, ensures the food product is cooked to the desired internal temperature. This provides the benefit of killing bacteria and other pathogens that can accompany raw or undercooked food. This is because it can be guaranteed that the entire food product will reach the desired internal temperature. This is contrasted to conventional cooking whereby even increasing the temperature to the outer surface may not increase the internal temperature to the desired levels. Accordingly, the method disclosed herein is more sanitary and safer, and more consistent than conventional methods of cooking such as grilling.

After cooking, in the case of proteins such as beef steak, the protein can be quickly seared to develop flavor and crisp the outside while remaining moisture and volume better than conventionally grilled meats. Other cooked foods do not need post-cooking treatment such as searing.

As noted, there are many benefits to the cooking method discussed herein. First, the use of a snorkel 103 allows more air to be removed from the sealable bag 101. In fact, as discussed, the snorkel 103 allows air to escape even when the sealable bag 101 is completely submerged which is not possible absent a snorkel. Further, the snorkel 103 offers an inexpensive alternative to expensive vacuum sealers. As noted, the snorkel 103 allows for the utilization of hydrostatic pressure to remove air within the sealable bag 101. Additionally, a single snorkel 103 can be used to remove air from two or more bags simultaneously, reducing redundant equipment while reducing preparation time. Further, as noted above, many sealers utilize vacuum pumps which cannot tolerate liquids. As such, for those sealers the users cannot cook with marinades, or other juices or liquids. Conversely, the system discussed herein allows for the utilization of liquids such as marinades during cooking. Taken further, these liquids can even be added during cooking which was not previously possible.

While the invention has been particularly shown and described with reference to a preferred embodiment, it will be understood by those skilled in the art that various changes in form and detail may be made therein without departing from the spirit and scope of the invention.

ADDITIONAL DESCRIPTION

The following clauses are offered as further description of the disclosed invention.

Clause 1. A system for packaging a product, said system comprising:
 a sealable bag;
 a bag seal located on said sealable bag;
 a snorkel comprising a top end and a bottom end, wherein said bottom end is fluidly coupled to said sealable bag;
 a snorkel cap coupled to said snorkel.

Clause 2. The system of any proceeding or preceding claim wherein said sealable bag comprises edge seals.

Clause 3. The system of any proceeding or preceding claim wherein said sealable bag comprises edge seals along three edges and a bag seal located on a top end of said sealable bag.

Clause 4. The system of any proceeding or preceding claim comprising two or more sealable bags coupled to said snorkel.

Clause 5. The system of any proceeding or preceding claim comprising a first sealable bag coupled to a snorkel, and a second sealable bag also coupled to said snorkel; wherein said first and second sealable bags are coupled in series.

Clause 6. The system of any proceeding or preceding claim comprising a first sealable bag coupled to a snorkel, and a second sealable bag also coupled to said snorkel; wherein said first and second sealable bags are coupled in parallel.

Clause 7. The system of any proceeding or preceding claim wherein said bag seal comprises a reusable bag seal.

Clause 8. The system of any proceeding or preceding claim wherein said sealable bag further comprises a port, and wherein said snorkel couples to said port.

Clause 9. The system of any proceeding or preceding claim wherein said snorkel comprises a diameter greater than about 4 mm.

Clause 10. The system of any proceeding or preceding claim wherein said bag seal comprises a zipper, and wherein the zipper has a top zipper layer which couples with a bottom zipper layer, and wherein the top zipper layer and the bottom zipper layer each comprise at least one male component and at least one female component.

Clause 11. The system of any proceeding or preceding claim further comprising a cooking bath for submerging said sealable bag, wherein said cooking bath comprises a volume of fluid, and wherein said sealable bag is submerged but the top end of said snorkel is not submerged.

Clause 12. The system of any proceeding or preceding claim further comprising a holder which couples to said snorkel and orients the top end of the snorkel above the fluid line in said cooking bath.

Clause 13. The system of any proceeding or preceding claim wherein said cooking bath comprises a heating element and a circulator.

Clause 14. The system of any proceeding or preceding claim wherein said sealable bag further comprises an anchor coupling device.

Clause 15. The system of any proceeding or preceding claim wherein the top end of the snorkel is coupled to a snorkel cap.

Clause 16. A method for cooking a product in a fluid bath, said method comprising the steps of:
  a) placing a food product into a sealable bag, wherein said sealable bag comprises a snorkel having a top end and a bottom end, wherein the bottom end is fluidly coupled to the sealable bag;
  b) sealing the sealable bag;
  c) submersing the sealable bag under the fluid;
  d) allowing air to escape through the snorkel;
  e) cooking said food product at a cooking temperature for a cooking time.

Clause 17. The method of any proceeding or preceding claim further comprising the step of closing said snorkel.

Clause 18. The method of any proceeding or preceding claim further comprising drawing a vacuum on said sealable bag through said snorkel.

Clause 19. The method of any proceeding or preceding claim wherein said allowing of step d) comprises using the hydrostatic pressure of the fluid to purge air through the snorkel.

Clause 20. The method of any proceeding or preceding claim wherein said allowing of step d) comprises applying a vacuum to said sealable bag.

What is claimed is:

1. A system for packaging a product, said system comprising:
  a first sealable bag containing a food product;
  a bag seal located on said sealable bag;
  a snorkel comprising a top end and a bottom end, wherein said bottom end is fluidly coupled to said sealable bag;
  a snorkel cap coupled to said snorkel and wherein said system further comprises a fluid bath for submerging said sealable bag, wherein said snorkel cap closes and seals said snorkel, wherein said fluid bath comprises a volume of fluid and a fluid line, and wherein said sealable bag is submerged within said fluid bath such that the entirety of said sealed bag is submerged, and wherein said bottom end of said snorkel is submerged within said fluid bath and below said fluid line, and wherein the top end of said snorkel is above said fluid line such that the top end of said snorkel is elevated vertically relative to said bottom end of said snorkel.

2. The system of claim 1 wherein said sealable bag comprises edge seals, and wherein said fluid bath comprises a cooking bath.

3. The system of claim 1 wherein said sealable bag comprises edge seals along three edges and wherein said bag seal is located on a top end of said sealable bag.

4. The system of claim 1 comprising two or more sealable bags coupled to said snorkel.

5. The system of claim 1 comprising a second sealable bag also coupled to said snorkel; wherein said first and second sealable bags are coupled in series.

6. The system of claim 1 comprising a second sealable bag also coupled to said snorkel; wherein said first and second sealable bags are coupled in parallel.

7. The system of claim 1 wherein said bag seal comprises a reusable bag seal.

8. The system of claim 1 wherein said sealable bag further comprises a port, and wherein said snorkel couples to said port.

9. The system of claim 1 wherein said snorkel comprises a diameter greater than 4 mm.

10. The system of claim 1 wherein said bag seal comprises a zipper, and wherein the zipper has a top zipper layer which couples with a bottom zipper layer, and wherein the top zipper layer and the bottom zipper layer each comprise at least one male component and at least one female component.

11. The system of claim 1 further comprising a holder which couples to said snorkel and orients the top end of the snorkel above the fluid line in said cooking bath.

12. The system of claim 1 wherein said system does not utilize a mechanical vacuum sealer.

13. The system of claim 1 wherein said sealable bag further comprises a hole for attaching an anchor.

14. A method for sealing product in a sealable bag under a fluid bath, said method comprising the steps of:
  a) placing a food product into a sealable bag, wherein said sealable bag comprises a snorkel having a top end and a bottom end, wherein the bottom end is fluidly coupled to the sealable bag such that the top end of said snorkel is elevated vertically relative to said bottom end of said snorkel;
  b) sealing the sealable bag;
  c) submersing the sealable bag under a fluid line in the fluid bath such that the entirety of said sealed bag is submerged, wherein the bottom end of the snorkel is below said fluid line, and wherein the top end of the snorkel is above the fluid line; and
  d) allowing air to escape through the snorkel;
  e) securing a snorkel cap to close and seal said snorkel.

15. The method of claim 14 further comprising the step of cooking said food product at a cooking temperature for a cooking time.

16. The method of claim 14 wherein step d) does not utilize a mechanical vacuum sealer.

17. The method of claim 14 wherein said allowing of step d) comprises using the hydrostatic pressure of the fluid to purge air through the snorkel.

18. The method of claim 14 wherein said allowing of step d) comprises applying a vacuum to said sealable bag.

* * * * *